Jan. 10, 1939.     H. G. LOMBARD     2,143,604
DOUBLE-ENDED FASTENING MEANS
Original Filed Dec. 8, 1936
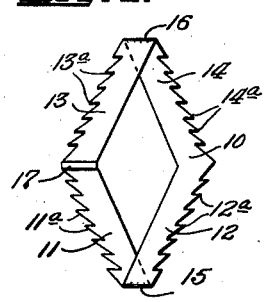
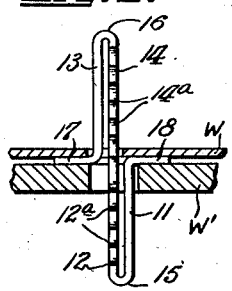
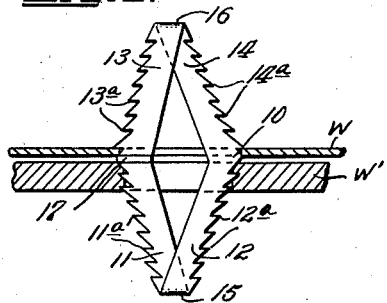
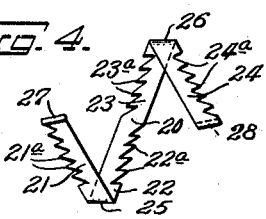
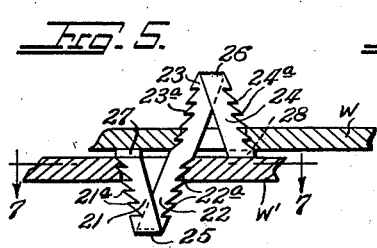
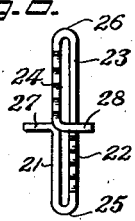
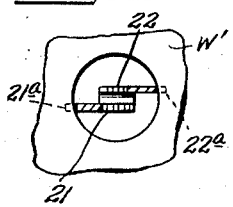
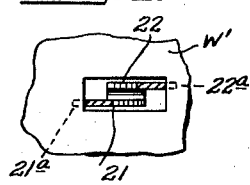
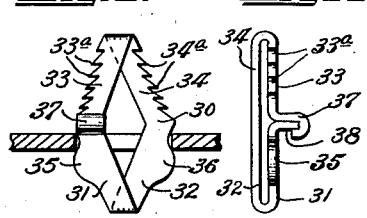
INVENTOR.
BY H. G. Lombard
ATTORNEY Patented Jan. 10, 1939

2,143,604

UNITED STATES PATENT OFFICE 2,143,604

DOUBLE-ENDED FASTENING MEANS

Herman G. Lombard, Washington, D. C., assignor to Albert H. Tinnerman, Cleveland, Ohio Original application December 8, 1936, Serial No. 114,825, now Patent No. 2,077,120, dated April 13, 1937. Divided and this application March 19, 1937, Serial No. 131,923

3 Claims. (Cl. 85—5)

This invention relates to double-ended fastening means of general application and of the type constructed from relatively thin material of sheet or strip form such as sheet spring steel, sheet metal, cold rolled metal, flattened wire or the like.

This application is a division of a prior copending application entitled "Fastening means", Serial No. 114,825, filed December 8, 1936, since issued as Patent Number 2,077,120, April 13, 1937.

More particularly, the double-ended fastening means of this invention comprises various forms of devices in which the respective shank structures consist of relatively yieldable leg elements the longitudinal edges of which are out of line in normal relation, such as to effect an engagement thereof under tension in fastening position against the side-walls or edges of an aperture in work.

Fastening devices of the type with which this invention deals are usually constructed of metal sheet material of suitable thickness, such as strip stock, or blank stampings from relatively wide stock. In the forming operation, the devices are so constructed as to provide various types of oppositely extending shank structures comprising relatively yieldable leg elements or shank sections.

In any form of fastening device comprising a shank in which there is obtained a yieldable relation of the shank sections or leg elements, an effective fastening means is provided in that on applying such a device in work in an aperture of less width or diameter than the spacing or overall width of the shank sections, a tension is set up in such shank sections, which tension provides a friction, press fit of the device in fastening position intended to prevent loosening and removal of the device from such position.

Heretofore, such fastening devices have been used somewhat satisfactorily in applications where no great degree of movement or vibration takes place in the work or members fastened or supported. However, where any degree of strain, jarring or vibration takes place, the shanks of such types of fasteners tend to loosen from their fastening position and eventually become completely removed due to the fact that the sections or elements comprising the shank do not possess sufficient inherent holding power and ability under such conditions.

It is therefore an object of this invention to provide various forms of double-ended fastening means and securing devices in which the respective shank members are composed of relatively yieldable shank elements or leg sections so disposed with respect to each other as to permit quick, easy insertion of the devices into a work aperture by a flexing and relative yielding thereof, yet when in fastening position, have such a degree of stiffness, rigidity and tension, stored therein through contact and compression against the side walls of the aperture that a tension is set up in the shank sections whereby substantial resistance is offered to withdrawal of the devices and extraordinary resistance is provided against loosening or tendency of the devices moving from applied position due to vibration, jarring or strain set up in the members fastened or in a member to which the device is applied.

It is a further object of this invention to provide various forms and constructions of double-ended fastening means and securing devices in which the shank members are composed of relatively yieldable shank sections which are so disposed in normal, untensioned relation as to engage the side-walls of the work aperture under compression in applied fastening position, whereby a tension is set up in the shank sections to effect a friction or press fit of the securing devices in such fastening position.

A further object of the invention is to provide double-ended securing devices having shank members the elements of which are so disposed in normal, spaced relation as to be placed under compression in contact against the aperture side walls to seat under tension in fastening position, the said shank sections being provided with integral, projecting or lug means such as shoulders, teeth, or cam surfaces serving to securely engage the work in fastening position, and thereby rigidly retain the devices in such position under tension due to the relative, lateral contraction, compression and movement of said shank sections from their normal spaced relation on being applied to a work aperture and advanced to fastening position, whereby an effective seating and locking of the devices in such fastening position is obtained to the action of the shank sections in attempting to assume their initial, normal, laterally spaced relation.

Another object of the invention aims to provide various forms of double-ended fastening means in which the respective shanks are integral and each comprises relatively yieldable leg elements or shank sections.

A further object of the invention is to provide double-ended fastening means the respective shanks of which are integrally united and substantially oppositely disposed.

A still further object is to provide double-ended fastening means in which the respective shanks are integrally united and disposed in offset relation with respect to each other.

Further objects and advantages of the invention will be apparent to those skilled in the art as a description thereof proceeds with reference to the accompanying drawing in which like reference characters designate like parts throughout the same, and in which:

Fig. 1 is a side elevation of a form of double-ended fastening means showing the respective shank elements as substantially oppositely disposed.

Fig. 2 is an end elevation of the device represented in Fig. 1 shown applied to fastening position in superposed members having aligned apertures.

Fig. 3 is a side elevation of Fig. 2.

Fig. 4 represents in side elevation a form of double-ended device in which the respective shanks are disposed in offset relation.

Fig. 5 shows the device of Fig. 4 as applied for securing superposed members in which the apertures may be out of line.

Fig. 6 is an end elevation of Fig. 4.

Fig. 7 is a section view taken along line 7—7 of Fig. 5 showing the position of leg members of a shank as applied to a substantially round work aperture.

Fig. 8 is a similar view as applied to a rectangular aperture in work.

Fig. 9 shows in side elevation a modified form of double-ended device in which the leg elements of one shank are provided with cam shoulders permitting ready withdrawal of such end in the manner of a snap stud.

Fig. 10 is a side elevation of the device represented in Fig. 9.

The various forms of double-ended fasteners herein disclosed are preferably constructed of a single section of flat metal such as sheet metal, sheet spring steel, flattened wire, or the like. The devices are so formed that the respective shanks each comprise relatively yieldable, offset leg elements or shank sections extending in converging relation toward the leading end of such shank. For example, a form of the double-ended device may be constructed from a strip of metal wherein the free ends of the strip are bent back upon the intermediate portion of the strip in folds disposed at an angle thereto such that such free ends are laterally yieldable with respect to the said intermediate portion. On bending the strip to thus dispose the folds at an angle, the leg elements of the respective shanks must naturally lie offset with respect to each other in normal, untensioned relation. And since the degree of offset of the legs is determined by the angle of the fold, the disposition of the legs relative to each other in normal position may assume a laterally offset or other form of offset relation; this offset relation of the legs may be so designed as to be most effective in an aperture of predetermined size in any desired location or installation. Thus, on being applied to an aperture in work of smaller width or diameter than the distance between the outer longitudinal edges of the legs in their normal, untensioned, laterally offset relation, the legs are caused to move from their normal offset relation to a position approaching alignment. Such movement of the legs from their normal, untensioned, laterally offset relation is designed to set up an extraordinary tension in the legs, which tension is exerted against the adjacent walls of the work aperture. In many instances the tension thus exerted is sufficient to maintain the device rigidly in fastening position in the work due to the unusual frictional engagement thus obtained against the side walls of the aperture. Where such frictional engagement alone is sufficient to maintain the shank in its applied position, the shank may be utilized for use as a separable fastening element and be withdrawn and removed as desired, without weakening, mutilating, or otherwise injuring the same. On removing the shank from an aperture, the legs naturally tend to assume their initial, normal, untensioned, offset relation whereby the shank may again be employed in the installation from which it was removed, much in the manner of a push or snap stud type of separable fastener.

In many other instances however it is necessary or desirable that the fastening device be readily removed or easily withdrawn from its applied fastening position. In such instances it is decidedly advantageous to employ on the legs of the shank some form of locking means to act in addition to the frictional engagement of the legs against the aperture side walls. Such locking means may be provided by recesses, shoulders, lugs, or series of teeth disposed on the legs preferably along the longitudinal edges thereof such as to contact and engage the aperture side walls and adjacent underface of the work in fastening position.

Figs. 1–3 inclusive show a form of double-ended fastening means in which the respective shanks are substantially oppositely disposed. The device may be formed from a strip in which the free ends are bent back upon themselves in folds 15, 16 disposed at an angle to the adjacent longitudinal edges of the strip to provide oppositely disposed shank members as shown in Fig. 1. The oppositely disposed shanks are thus composed of relatively yieldable legs 11, 12, and 13, 14, the legs 12, 14 being integral in the intermediate portion of the strip as at 10. The extremities of the free ends of the strip consisting of the laterally yieldable legs 11, 12 may suitably be bent to provide bearing sections 17, 18 as shown in Fig. 2. Along the outer longitudinal edges of the legs of the respective shanks, recesses may be provided to present series of lugs such as teeth 11a, 12a, and 13a, 14a, designed to engage in the work apertures and resist withdrawal or movement of the devices from their applied fastening position. As shown in Figs. 2 and 3 the device is especially adapted for use in securing superposed members such as W, W', the apertures of which are in substantial alignment. In application of the device, one shank is applied to the aperture in a member, W' for example, until the bearing sections 17, 18 rest against the upper face of such member, whereupon the other member W is applied and forced onto the opposite shank until it lies flush against the said bearing sections in desired fastening position.

Figs. 4–6 inclusive show another form of double-ended device in which the respective shanks are composed of laterally yieldable elements and are disposed in offset relation for securing superposed members, the apertures of which are out of line. As shown in Fig. 4, this form of the device may also be constructed from a strip of material with the intermediate portion providing the legs 22, 23, of the respective, oppositely extending shanks. The free ends of the strip are bent back upon the intermediate portion as by folds 25, 26 to provide the laterally yieldable shank legs 21, 24. The device is thus composed of oppositely extending, offset shank members comprising shank legs 21, 22, and 23, 24 the legs 22, 23 being integral at 20. The extremities of the free ends of the respective yieldable legs 21, 24 may be suitably bent to provide bearing sections 27, 28. The shank legs may be provided with lug, shoulder or abutment means such as teeth 21a, 22a, and 23a, 24a adapted to engage in the respective work apertures under tension of the relatively yieldable legs to rigidly retain the shanks in applied fastening position. The operation and use of this form of double-ended fastening means is substantially similar to that described above in connection with Figs. 1-3 inclusive, and as shown in Figs. 4 and 5, any of the respective shank members may engage equally as well in a round or rectangular aperture in work.

Figs. 9 and 10 show a form of double-ended fastening means in which the shank legs of one or both shanks may be provided with cam surfaces such that a shank so provided is effectively retained in applied position yet may be readily withdrawn, if desired, in the manner of a snap stud. As shown in Fig. 9 the lower shank of this form of double-ended fastening means is composed of laterally yieldable legs 31, 32 having cam surfaces 35, 36, the upper shank being composed of relatively yieldable legs 33, 34 which may be provided with lug, shoulder or abutment means, such as series of teeth 33a, 34a. The legs 32, 34 are integral as at 30 while legs 31, 33, provided from the free ends of the strip, are folded in the same direction to lie in a substantially common plane, as shown in Fig. 10, with the extremities 37, 38, deformed to extend in the same general direction. The extremities may be interconnected in any expedient manner such as by welding, riveting, lapping or otherwise uniting one with the other to prevent axial movement of the opposite shanks away from each other. As shown in Fig. 10, a simple means for uniting the extremities of the free ends of the relatively yieldable legs is effected by lapping the extremity 37 over and onto the shorter extremity 38. The operation and use of devices of this form is substantially similar to that described above in connection with Figs. 1-3 inclusive.

While the invention has been described in detail with specific examples, such examples are illustrative only, since other modifications within the spirit and scope of the invention will be apparent to those skilled in the art. Hence the invention is to be understood as limited only as indicated in the appended claims in which the intent is to set forth all the novelty over the prior art.

What is claimed is:

1. A one-piece, double-ended sheet metal fastening device for connecting preforated apertured parts, said fastening device comprising a section of sheet metal having a bend on either side of the mid-portion thereof to provide oppositely extending integral shank members, said shank members each comprising relatively yieldable cooperating leg elements integrally united to form leading ends for the respective shank members, the cooperating leg elements of each shank member being disposed laterally at an angle to each other in normal untensioned relation to present laterally projecting shank portions having outer longitudinal edges spaced apart a distance greater than the width of the cooperating work aperture to which it is applied, whereby said shank members are locked in their respective work apertures in applied fastening position under continuously effective spring tension of the leg elements of each shank member attempting to assume their normal untensioned relation laterally at an angle to each other.

2. A one-piece, double-ended sheet metal fastening device for connecting preperforated apertured parts, said fastening device comprising a section of sheet metal having a bend on either side of the mid-portion thereof to provide oppositely extending integral shank members, said shank members each comprising relatively yieldable cooperating leg elements integrally united to form leading ends for the respective shank members, the cooperating leg elements of each shank member being disposed laterally at an angle to each other in normal untensioned relation to present laterally projecting shank portions having outer longitudinal edges spaced apart a distance greater than the width of the cooperating work aperture in the part to which it is applied, said outer longitudinal edges being provided with shoulders designed for engaging the adjacent underface of such apertured part, whereby said shank members are locked in their respective work apertures in applied fastening position under continuously effective spring tension of the leg elements of each shank member attempting to assume their normal untensioned relation laterally at an angle to each other.

3. A one-piece, double-ended sheet metal fastening device for connecting preperforated apertured parts, said fastening device comprising a section of sheet metal having a bend on either side of the mid-portion thereof to provide oppositely extending integral shank members, said shank members each comprising relatively yieldable cooperating leg elements integrally united to form leading ends for the respective shank members, the cooperating leg elements of each shank member being disposed laterally at an angle to each other in normal untensioned relation to present laterally projecting shank portions having outer longitudinal edges spaced apart a distance greater than the width of the cooperating work aperture in the part to which it is applied, each shank member being of greater length than the thickness of the apertured part to which it is applied and said longitudinal edges of the leg elements including guide surfaces facilitating application thereof and being provided with shoulders designed for engaging the adjacent underface of such apertured part, whereby each said shank members are locked in their respective work apertures in applied fastening position under continuously effective spring tension of the cooperating leg elements attempting to assume their normal untensioned relation laterally at an angle to each other.

HERMAN G. LOMBARD.